United States Patent [19]

Maistre

[11] 4,268,560
[45] May 19, 1981

[54] THREE-DIMENSIONAL STRUCTURE HAVING A PREFERENTIAL DIRECTION

[75] Inventor: Michel Maistre, Bordeaux, France

[73] Assignee: Societe Europeenne de Propulsion, Puteaux, France

[21] Appl. No.: 22,195

[22] Filed: Mar. 20, 1979

[30] Foreign Application Priority Data

Jun. 2, 1978 [FR] France ............................... 78 16610

[51] Int. Cl.³ .......................... B32B 5/12; E04H 12/00
[52] U.S. Cl. ...................................... 428/105; 52/648; 428/107; 428/112; 428/113; 428/114; 428/397
[58] Field of Search .............. 428/113, 105, 114, 367, 428/268, 397, 402, 364, 902, 542; 52/730, 719, 653, 648

[56] References Cited

U.S. PATENT DOCUMENTS 3,949,126  4/1976  Crawford ............................ 428/113

FOREIGN PATENT DOCUMENTS 1144910  9/1963  Fed. Rep. of Germany .
1478315  3/1967  France .
2276916  5/1976  France .

Primary Examiner—Paul J. Thibodeau
Attorney, Agent, or Firm—Staas & Halsey

[57] ABSTRACT

The present invention relates to a three-dimensional structure having a preferential direction, said structure comprising a main bundle constituted by equidistant rectilinear elements parallel to the preferential direction and four connecting bundles oriented in four different directions. A first and a second connecting bundle are formed of elements disposed in rows in planes parallel to the planes defined by the rows of the main bundle, the rows of the first and of the second bundle being disposed alternately in gaps between rows of elements of the main bundle. A third and a fourth connecting bundle are formed of elements disposed in rows in planes parallel to the planes defined by the alignments of opposite elements of adjacent rows of the main bundle, the rows of the third and fourth bundles being disposed alternately in gaps between alignments of elements of the main bundle. The structure is suitable as reinforcement for a composite material.

10 Claims, 1 Drawing Figure

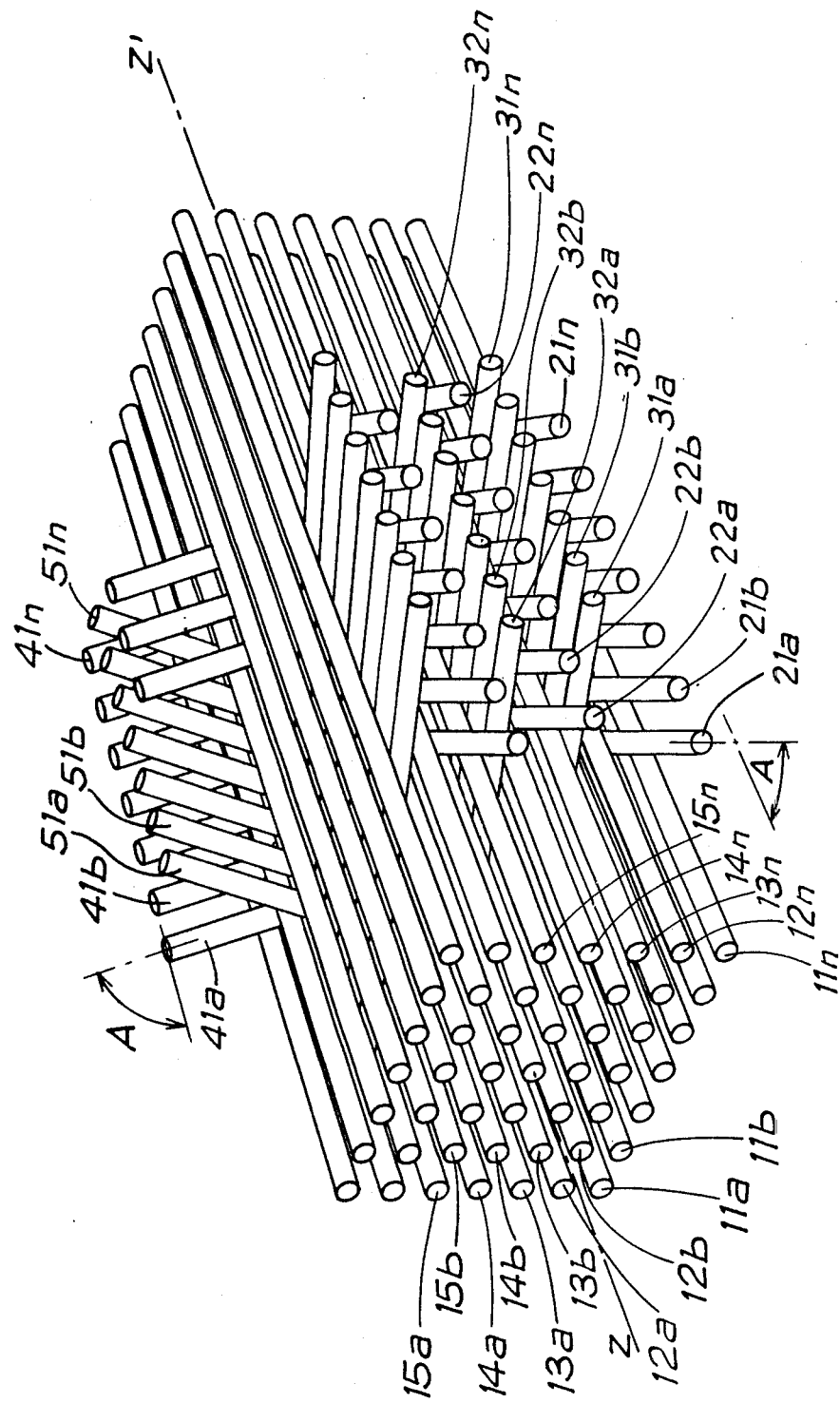

THREE-DIMENSIONAL STRUCTURE HAVING A PREFERENTIAL DIRECTION

The present invention relates to a three-dimensional structure having a preferential direction, of the type comprising a main bundle constituted by main rectilinear filiform elements parallel to the preferential direction and disposed in regularly spaced apart rows so as to form, in transverse section, a network with square meshes, and a plurality of connecting bundles, each constituted by rectilinear filiform connecting elements parallel to one another, the directions of the connecting bundles being different from one another and different from the preferential direction.

The advantages of the orderly three-dimensional structures used as reinforcement for composite materials, for example carbon-carbon materials, are known. Reference may be made to French Pat. No. 2,276,916.

Various three-dimensional structures constituted by the regular intersection of 3, 4, 7, 11, . . . bundles rectilinear filiform elements have been designed and developed to serve as reinforcement for composite materials with the purpose of obtaining the best possible isotropy of the properties.

This isotropy which is desirable and advantageous for numerous applications does not always correspond to the optimum use of the possibilities of the constituting parts of the composite material and especially the reinforcing structure.

For certain applications where the composite piece is more strongly urged in one direction than in the others, it is preferable to use a composite material which, whilst being reinforced by a three-dimensional structure guaranteeing it a perfect cohesion, presents a preferential direction along which it is, for example, more resistant mechanically, more heat-conductive or more resistant to ablation or to abrasion than in any other direction.

This is the case, for example, of the production of tips of bodies re-entering the atmosphere for which it is desirable that the refractory composite material with three-dimensional reinforcement which is well suited to this use, comprises a higher content of reinforcing elements in the axial direction than in the other directions in order to increase as much as possible its resistance to ablation without compromising its cohesion.

It is well known that such a result may be obtained fairly simply by using as reinforcement a structure of the triorthogonal type, of which one of the bundles is constituted by filiform elements of larger section than those constituting the other two orthogonal bundles, the essential purpose of these latter then being to connect the elements of the main bundle together.

"Structure of triorthogonal type" is understood to mean a structure constituted by three bundles of elements oriented in three mutually perpendicular directions.

Now, it has been proved that this structure of triorthogonal type presents several drawbacks.

In the first place, the empty spaces, or macroporosities, which are located between the filiform elements constituting the structure have the form of parallelepipedic volumes virtually isolated from one another and consequently are not easily accessible and are difficult to fill with matrix to constitute the composite material.

In the second place, dimensional variations have been observed, with the structure of the triorthogonal type, upon filling with the matrix for making the composite material, and a decohesion of the structure when the composite material is used. This may be explained by the fact that the layers formed by two perpendicular bundles are subject to delamination along the third bundle which does not constitute a real locking.

It is an object of the present invention to provide a structure of the type defined hereinabove, said structure enabling the above-mentioned drawbacks of the structure of the triorthogonal type to be overcome, whilst presenting a high volume content of reinforcement material.

This aim is attained by a structure which comprises, according to the invention, four connecting bundles oriented in four different directions, a first and a second connecting bundle being formed by elements disposed in rows extending along planes parallel to the planes defined by the rows of the main bundle, the rows of the first and second bundle being disposed alternately in first gaps between successive rows of elements of the main bundle, and a third and a fourth connecting bundle being formed of elements disposed in rows extending along planes parallel to the planes defined by the alignments of opposite elements belonging to successive rows of the main bundles, the rows of the third and fourth bundles being disposed alternately in second gaps between successive alignments of elements of the main bundle.

The structure according to the invention therefore comprises a main bundle connected by four connecting bundles.

Due to the arrangement of the connecting bundles, the empty spaces located between the elements of the structure and which will have to be filled by the matrix to constitute the composite are formed by a three-dimensional network of intercommunicating channels so that they are highly accessible and easy to fill with matrix.

In addition, due to the regular criss-cross of the connecting bundles and to the larger number of directions of reinforcement, the composite reinforced by a structure according to the invention has a better cohesion and a better dimensional stability than the composite reinforced by a structure of the triorthogonal type.

Finally, the angles between the main bundle and each of the connecting bundles may be chosen to be more or less acute according to whether it is desired that the elements of the connecting bundles participate more or less in the reinforcement in the preferential direction.

For the clarity of the specification, it may be considered that the elements of the main bundle are disposed in parallel, equidistant rows, each row being formed of parallel and equidistant elements, the elements of each row being placed plumb with the elements of the adjacent rows, the distance between adjacent elements of the same row being the same as the distance between adjacent rows and being such that there is place between adjacent rows, on the one hand and between alignments of opposite elements belonging to successive rows, on the other hand, to intercalate other elements which will constitute the connecting system.

The dimensions of each connecting element, measured perpendicularly to the plane parallel to the rows of the connecting bundle containing this connecting element, is preferably equal to the width of the gap between adjacent rows of main elements in which this connecting element is housed.

Thus, the connecting elements having a size equal to the space left free between adjacent rows of the main bundle or between adjacent elements of the same row, a high volume content of reinforcement is attained.

According to a feature of the structure according to the invention, the directions of the first and second connecting bundles form an angle equal to that formed by the directions of the third and fourth connecting bundles.

According to another feature of the structure according to the invention, the elements of each connecting bundle are, in each row, regularly spaced apart and have a constant transverse section.

The elements constituting the structure preferably have a polygonal or circular transverse section. The choice of elements of square transverse section for constituting the main bundle is a condition necessary for obtaining a maximum volume content of reinforcement.

According to a further feature of the structure according to the invention, the privileged character of the direction of the main bundle is further emphasized by choosing, for said latter, elements of transverse section larger than that of the connecting elements.

The invention will be more readily understood on reading the following description with reference to the accompanying drawings, in which:

BRIEF DESCRIPTION OF THE DRAWINGS

The single FIGURE schematically illustrates the arrangement of the elements in a structure according to the invention.

DETAILED DESCRIPTION OF THE DRAWINGS

A first row of elements of the main bundle is firstly disposed on a horizontal plane, these elements $11a$, $11b$, ..., $11n$ being regularly spaced apart and parallel to the preferential direction z'z.

The following are then successively disposed on this first row:

(1) a row of elements $21a$, $21b$, ... $21n$ of the first connecting bundle, these elements being parallel to one another and regularly spaced apart and making with the elements of the main bundle an angle A different from 0° and from 90° so that this bundle is neither parallel nor perpendicular to the main bundle;

(2) a second row of elements $12a$, $12b$, ... $12n$ of the main bundle so that these elements which are parallel to one another and regularly spaced apart are perfectly superposed with respect to those of the first row of this same bundle;

(3) a first row of elements $31a$, $31b$, ... $31n$ of the second connecting bundle, these elements, identical to those constituting the first connecting bundle, being parallel to one another and regularly spaced with a spacing identical to that between the elements of the first connecting bundle, and making with the elements of the main bundle an angle equal to but of direction opposite that made by the first connecting bundle with the main bundle. It follows that this second connecting bundle makes an angle different from 0° with the first connecting bundle and is therefore not parallel thereto;

(4) A third row of elements $13a$, $13b$ ... $13n$ of the main bundle so that these elements are perfectly superposed with respect to those of the first and second rows;

(5) a second row of elements $22a$, $22b$, ... $22n$ of the first connecting bundle, so that these elements are perfectly superposed with respect to those of the first row of this first connecting bundle, or, as a variant, regularly offset so that the elements of the first connecting bundle are quinconxially arranged as shown in the drawing;

(6) a fourth row of elements $14a$, $14b$, ... $14n$ of the main bundle;

(7) a second row of elements $32a$, $32b$, ... $32n$ of the second connecting bundle, so that these elements are perfectly superposed with respect to those of the first row of this second connecting bundle, or regularly offset "in quincunx" if this was already the case for the elements of the second row of the first connecting bundle with respect to the first row;

(8) a fifth row of elements $15a$, $15b$, ... $15n$ of the main bundle; etc. . . .

The stack of rows in horizontal layers is thus continued by regularly and successively alternating rows of the main bundle, of the first connecting bundle, of the main bundle, and of the second connecting bundle, the successive rows of the first connecting bundle on the one hand and of the second connecting bundle on the other hand all being simultaneously either regularly superposed or regularly offset "in quincunx", the successive rows of the main bundle being in all cases regularly superposed. These two possible arrangements for the successive rows of the connecting bundles correspond to two variants of the structure according to the invention of which examples are given hereinafter.

The construction of the structure is then continued as follows:

The superposed and regularly spaced apart elements of the successive rows of the main bundle determine plane, vertical, regularly spaced gaps in which rows of elements which will constitute the third and fourth connecting bundles will be alternately positioned. These plane gaps are not totally clear. In fact, the elements of the first and second connecting bundles pass obliquely therethrough so that it is possible to introduce the elements which will constitute the third and fourth connecting bundles only in certain directions predetermined by the orientation, size and spacing of the elements of the first and second connecting bundles.

A row of regularly spaced apart elements $41a$, $41b$, ... $41n$ which constitute the first row of the third connecting bundle is therefore introduced into one of the plane vertical spaces defined previously and in an oblique direction imposed by the elements of the first and second connecting bundles. The regular spacing is imposed, in the same way as the orientation, by the elements of the first and second connecting bundles. The operation is continued by introducing into the adjacent plane gap a row of elements $51a$, $51b$, ... $51n$ of which the oblique orientation imposed by the elements of the first and second connecting bundles makes with the elements of the main bundle an angle equal to but in opposite direction from that formed by the elements of the third bundle with the main bundle. The spacing between elements is also imposed. This series of elements constitutes the first row of the fourth connecting bundle.

The following plane vertical space similarly receives a second row of elements of the third bundle, and the following a second row of elements (not shown) of the fourth connecting bundle.

The positioning, in the successive vertical plane, of rows of elements which are parallel and alternately and respectively oriented like those of the first and second row already positioned is thus continued, so that the structure according to the invention is completed by the positioning in alternate rows of the elements of the third and fourth connecting bundles.

In the preferred embodiment of the invention which allows multiple variants, the following features are adopted:
(1) the filiform elements constituting the main and connecting bundles have a square or round section;
(2) in each of the bundles, all the elements are identical;
(3) the elements constituting the four connecting bundles are identical to one another but may be different from those of the main bundle. They are generally, but not necessarily, of smaller section. The difference between elements of the connecting bundles and of the main bundle may be in the shape, size or the material used;
(4) The free space between adjacent elements of the main bundle is equal to the diameter of the elements of the four connecting bundles, or to the side of their transverse section if said section is square.
(5) the space between the adjacent elements within each row of the first and second connecting bundles and the angles formed in the horizontal plane by the elements of these two bundles with the elements of the main bundle are such that the elements of the third and fourth connecting bundles present a spacing between adjacent elements within each row identical to that of the elements of the first and second bundle, and form with the elements of the main bundle, in the vertical plane, angles which are identical and of opposite directions, these angles being the same as those formed by the first and second bundles with the main bundle in the horizontal plane. The directions of the first and second connecting bundles then make an angle equal to the one formed by the directions of the third and fourth connecting bundles.

The following examples will enable this mode of construction and the diversity of the forms which such a structure may take, to be illustrated.

EXAMPLE 1

The main bundle is formed of rectilinear elements of square section with sides measuring 2 mm. The connecting bundles are formed of rectilinear elements of round section of 1 mm diameter.

Within each row of the main bundle, the distance betwen axes of adjacent elements is 3 mm so that the free space between adjacent elements is 1 mm.

Within each row of the first and second connecting bundles, the free space between adjacent elements is 1.03 mm and the angle formed by these elements with respect to the elements of the main bundle, in the horizontal plane, is ±80.27°.

Upon construction, the elements within the successive rows of the first connecting bundle, on the one hand, and of the second connecting bundle, on the other hand, are regularly offset "in quincunx".

These conditions impose identical features on the elements of the third and fourth connecting bundles concerning their spacing within the same row, the angles which they form in the vertical plane with the elements of the main bundle and their stagger in quincunx in the successive rows of the same bundle.

Within this structure, the elements of the main bundle occupy 44.44% of the total volume whilst those of each of the four connecting bundles occupy only 6.45% of the total volume. The free volume which will have to be filled by the matrix to make a composite represents the complement, viz. 29.76%.

It may be observed that, simultaneously, this structure makes it possible to introduce a very high rate of reinforcement in the composite, since the volume content of reinforcement slightly exceeds 70%, and this reinforcement presents a clearly preferential direction since the main bundle alone represents more than 63% of the total volume of the reinforcement, whilst each of the other four bundles represents only 9.25% of the total.

EXAMPLE 2

In this example, the main bundle is also formed of rectilinear elements of square section, with sides measuring 2 mm, and the connecting bundles are also formed of rectilinear elements of circular section, of 1 mm diameter, but the arrangement is different from that of the first example.

Within each row of the main bundle, the free space between adjacent elements is 1 mm.

Within each row of the first and second connecting bundles, the free space between adjacent elements is 1.12 mm and the angle formed by these elements with respect to the elements of the main bundle, in the horizontal plane, is 69.29°.

Upon construction, the elements within the successive rows of the first bundle on the one hand and of the second bundle on the other hand are superposed.

These conditions impose identical characteristics on the elements of the third and fourth connecting bundles.

Within this structure, the elements of the main bundle occupy 44.44% of the total volume, whilst those of each of the four connecting bundles occupy only 6.17% of the total volume. The porosity represents the complement, viz. 30.88%.

EXAMPLE 3

In this example, the main bundle as well as the four connecting bundles are wall formed of rectilinear elements of circular section, with 1 mm diameter (as illustrated in the FIGURE).

Within each row of the main bundle, the free space between adjacent elements is 1 mm.

Within each row of the first and second connecting bundles, the free space between adjacent elements is 1.07 mm, and the angle formed by these elements with respect to the elements of the main bundle, in the horizontal plane, is 75.04°.

Upon construction, the elements within the successive rows of the first bundle, on the one hand, and of the second bundle, on the other hand, are quincunxially arranged.

These conditions impose identical characteristics on the elements of the third and fourth connecting bundles.

Within this structure, the elements of the main bundle occupy 19.6% of the total volume whilst those of each of the four connecting bundles occupy only 9.5% of the total volume. The porosity represents the complement, viz. 42.4%.

EXAMPLE 4

In this example, the main bundle as well as the four connecting bundles are all formed of rectilinear elements of square section, with sides measuring 1 mm.

Within each row of the main bundle, the free space between adjacent element is 1 mm.

Within each row of the first and second connecting bundle, the free space between adjacent elements is 1.67 mm and the angle formed by these elements with respect to the elements of the main bundle, in the horizontal plane, is 70.53°.

Upon construction, the elements within the successive rows of the first bundle, on the one hand, and of the second bundle on the other hand, are quincunxially arranged.

These conditions impose identical characteristics on the elements of the third and fourth connecting bundles.

Within this structure, the elements of the main bundle occupy 25.0% of the total volume whilst those of each of the four connecting bundles occupy only 9.375% of the total volume. The porosity represents the complement, viz. 37.50%.

I claim:

1. A three-dimensional structure having a preferential direction, consisting of a main bundle and four connecting bundles, said main bundle being constituted by main, rectilinear, filiform elements parallel to the preferential direction and disposed in parallel, regularly spaced apart rows extending along planes parallel to each other so as to form, in cross-section perpendicular to the preferential direction a network of square meshes, and each connecting bundle being constituted by rectilinear filiform connecting elements parallel to one another, the directions of the connecting bundles being different from one another and diagonal to the preferential direction, a first and a second connecting bundle being formed of elements disposed in first rows extending along first planes parallel to said planes defined by said rows of the main bundle, said first rows of the first and second bundles being disposed alternately in first gaps between successive ones of said rows of elements of the main bundle, and a third and a fourth connecting bundle being formed of elements disposed in second rows extending along second planes perpendicular to said first planes and parallel to the planes defined by alignments formed of opposite elements belonging to successive different ones of said rows of the main bundle, said second rows of the third and fourth bundles being disposed alternately in second gaps between successive ones of said alignments of elements of the main bundle.

2. A structure as claimed in claim 1, wherein the directions of the first and second connecting bundles form an angle equal to that formed by the directions of the third and fourth connecting bundles.

3. A structure as claimed in claim 1, wherein the elements of each connecting bundle are, in each row, regularly spaced apart.

4. A structure as claimed in claim 1, wherein the elements of each connecting bundle have a constant cross-section.

5. A structure as claimed in claim 4, wherein the dimension of each connecting element, measured perpendicularly to the plane parallel to the rows of the connecting bundle containing the connecting elements, is equal to the width of said first or second gap in which each connecting element is housed.

6. A structure as claimed in claim 1, wherein the elements of the main bundle have a larger cross-section than that of the connecting elements.

7. A structure as claimed in claim 1, wherein the elements of the main bundle have a square cross-section.

8. A structure as claimed in claim 1, wherein the elements of the successive rows of each connecting bundle are quincunxially arranged.

9. A structure as claimed in claim 1, wherein the elements of the successive rows of each connecting bundle are aligned along planes perpendicular to the plane parallel to the rows of the respective connecting bundle.

10. A three-dimensional structure having a preferential direction, consisting of a main bundle and four connecting bundles, said main bundle being constituted by main, rectilinear, filiform elements parallel to the preferential direction and disposed in regularly spaced apart rows extending along planes parallel to each other so as to form, in cross-section perpendicular to the preferential direction, a network of square meshes, and said connecting bundles being each constituted by rectilinear filiform connecting elements, and having directions different from each other and diagonal to the preferential direction, a first and a second connecting bundle being formed of elements disposed in first rows extending along planes parallel to said rows of main elements and disposed alternately in first gaps therebetween with the direction of said first bundle being at a first angle with respect to the preferential direction equal to but opposite the angle between the direction of the second bundle and the preferential direction, and a third and a fourth connecting bundle being formed of elements disposed in second rows extending along planes perpendicular to said rows of main elements and disposed alternately in second gaps between successive alignments formed of opposite main elements belonging to successive different ones of said rows of the main bundle, with the direction of said third bundle being at an angle with respect to the preferential direction equal to said first angle and equal to but opposite the angle between the direction of the fourth bundle and the preferential direction.

* * * * *